(12) United States Patent
Wei et al.

(10) Patent No.: US 12,162,970 B2
(45) Date of Patent: Dec. 10, 2024

(54) WATER-BORNE POLYMERS POLYMERIZED BY RADICAL POLYMERIZATION WITH AZO INITIATORS, A PROCESS FOR MAKING SUCH AND THE APPLICATIONS THEREOF

(71) Applicant: BASF SE, Ludwigshafen am Rhein (DE)

(72) Inventors: Zhen Wei, Shanghai (CN); Zhong Zeng, Shanghai (CN); En Lin Zhang, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 328 days.

(21) Appl. No.: 17/631,994

(22) PCT Filed: Jul. 27, 2020

(86) PCT No.: PCT/EP2020/071092
§ 371 (c)(1),
(2) Date: Feb. 1, 2022

(87) PCT Pub. No.: WO2021/023541
PCT Pub. Date: Feb. 11, 2021

(65) Prior Publication Data
US 2022/0275131 A1    Sep. 1, 2022

(30) Foreign Application Priority Data

Aug. 6, 2019 (WO) ................ PCT/CN2019/099491

(51) Int. Cl.
*C08F 4/04* (2006.01)
*C08F 257/02* (2006.01)
*C09D 151/00* (2006.01)

(52) U.S. Cl.
CPC ........ *C08F 257/02* (2013.01); *C09D 151/003* (2013.01)

(58) Field of Classification Search
CPC ........ C08F 257/02; C08F 4/04; C09D 151/03; C09D 7/43

USPC ........................................... 524/560
See application file for complete search history.

(56) References Cited

U.S. PATENT DOCUMENTS

| | | | |
|---|---|---|---|
| 5,691,416 A * | 11/1997 | Yoshida ................ | C08F 265/04 523/411 |
| 7,999,050 B2 | 8/2011 | Zhao | |
| 8,772,386 B2 | 7/2014 | Xu et al. | |
| 2005/0203211 A1* | 9/2005 | Gebhard ............... | C08F 265/06 523/205 |
| 2006/0205844 A1* | 9/2006 | Mizutani .............. | C09D 11/322 523/205 |
| 2018/0312699 A1 | 11/2018 | Akiyama et al. | |

FOREIGN PATENT DOCUMENTS

| | | |
|---|---|---|
| JP | 2003-040917 A | 2/2003 |
| JP | 2011-057891 A | 3/2011 |
| WO | 2020/030428 A1 | 2/2020 |

OTHER PUBLICATIONS

International Preliminary Report on Patentability received for PCT Patent Application No. PCT/EP2020/071092, mailed on Feb. 17, 2022, 8 pages.
Moghbeli, et al., "Synthesis of SBR/PMMA core/shell latices: The role of initiator and surfactant on particle morphology and instability performance", Journal of Applied Polymer Science, vol. 105, Issue 3, Apr. 23, 2007, pp. 1412-1419.
Thomas G. Fox, "Influence of Diluent and of Copolymer Composition on the Glass Temperature of a Poly-mer System", Bulletin of the American Physical Society, vol. 1, Issue 3, 1956, p. 123.
International Search Report and Written Opinion received for PCT Patent Application No. PCT/EP2020/071092, mailed on Nov. 4, 2020, 8 pages.

* cited by examiner

*Primary Examiner* — Hannah J Pak
(74) *Attorney, Agent, or Firm* — Faegre Drinker Biddle & Reath LLP

(57) ABSTRACT

The present invention is related to water-borne polymers polymerized by radical polymerization with azo initiators, a process for making the polymers and the application thereof. The polymers polymerized with azo initiators show superior water-whitening resistance and scrub resistance, which are desired properties for coatings applications.

11 Claims, No Drawings

WATER-BORNE POLYMERS POLYMERIZED BY RADICAL POLYMERIZATION WITH AZO INITIATORS, A PROCESS FOR MAKING SUCH AND THE APPLICATIONS THEREOF

CROSS-REFERENCE TO RELATED APPLICATIONS

This application is a national stage application (under 35 U.S.C. § 371) of PCT/EP2020/071092, filed Jul. 27, 2020, which claims benefit of Chinese Application No. PCT/CN2019/099491, filed Aug. 6, 2019, both of which are incorporated herein by reference in their entirety.

FIELD OF THE INVENTION

The present invention is related to water-borne polymers polymerized by radical polymerization with azo initiators, a process for making the polymers and the application thereof. The polymers show superior water-whitening resistance and scrub resistance, and find applications in coatings, especially architecture coatings.

BACKGROUND OF THE INVENTION

Water-borne polymers have been used in many fields, including architecture coatings. Architecture coatings are subjected to snow and rain as well as other weathering process, therefore, water-whitening resistance and scrub resistance are desired properties of architecture coatings.

In order to find a solution to produce an emulsion with both great water-whitening resistance properties and scrub resistance properties, researchers have been focused on varying the monomer composition.

U.S. Pat. No. 8,772,386B2 discloses an aqueous copolymer dispersion comprising a copolymer and a polyamine, wherein the copolymer comprises, as copolymerized units, at least one nonionic monomer selected from C6-C22 alkyl esters of (meth)acrylic acid and/or vinyl esters of C9-C11 tertiary-alkanoic acids and 0.05 to 3 wt % of a monomer having at least one alkoxysilane functionality; wherein the amount of the nonionic monomer ranges from 15 wt % to less than 50 wt % and wherein the amount of the polyamine ranges from 0.1 to 2 wt %, by dry weight percentage based on the total dry weight of the copolymer dispersion. The dispersion shows good water-whitening resistance property, however, there is no scrub resistant data provided in the patent.

U.S. Pat. No. 7,999,050B2 discloses a method of making an aqueous polymer dispersion by reacting, in a reactor, a non-halogenated acetoacetate group containing monomer, at least one additional monomer, a base to neutralize the acidic monomer, and a molecular weight reducing agent in an amount less than about 0.7 weight percent, based on the total weight of the monomers of a molecular weight reducing agent. This method results in an emulsion with good scrub resistance property. But, no information about water-whitening resistance properties has been mentioned.

However, little effort has been put into the direction of applying different initiators in the emulsion polymerization process, although various initiating systems have been widely used in water-borne polymer polymerizations. Persulfates and redox initiators are most commonly used one while azo initiators are seldomly applied.

JP2003040917A discloses a method to produce water soluble polymers with water soluble monomers in the presence of water soluble azo initiators. A combination of two azo initiators is applied, with (A) an azo polymerization initiator having a half-life temperature of 10 hours at 70° C. or above and (B) an azo polymerization initiator having a half-life temperature of 10 hours at 70° C. or below. The resulted polymers have high molecular weight and low content of residue monomers. However, it provides no clue about the water-whitening resistance and scrub resistance properties.

J. Appl. Poly. Sci. year 2007, Volume 105, pages 1412-1419, discloses the synthesis of structural latices with AlBN and KPS as the first and second-stage initiators, respectively. In this article, two different initiators are used in the polymerization process which makes it more complicated. In addition, there is no clue about the water-whitening resistance and scrub resistance properties.

SUMMARY

One objective of the present invention is to provide a water-bone polymer emulsion with excellent water-whitening resistance and scrub resistance properties. The polymer emulsion is synthesized using azo initiators, wherein the azo initiators are of Formula I:

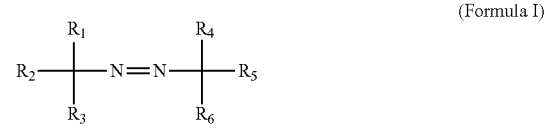

(Formula I)

Wherein the $R_1$-$R_6$ independently of each other stand for, but not limited to, H, C1-C12 alkyl groups, C5-C12 cyclic alkyl groups, heterocyclic groups, nitrile group, carboxylic esters, amides, ethers, alkoxy groups and acetyl groups.

Another objective of the present invention is to provide a process for the production of water-borne polymer emulsions by emulsion polymerization in the presence of azo initiators.

A third objective of the present invention is related to the application of water-borne polymer emulsions as binders for coatings, wherein the water-borne polymer emulsions are polymerized by radical polymerization in the presence of azo initiators.

DETAILED DESCRIPTION OF THE INVENTION

Unless otherwise specified, all terms/terminology/nomenclatures used herein have the same meaning as commonly understood by the skilled person in the art to which this invention belongs to.

Expressions "a", "an" and "the", when used to define a term, include both the plural and singular forms of the term.

The term "polymer" or "polymers", as used herein, includes both homopolymer(s), that is, polymers prepared from a single reactive compound, and copolymer(s), that is, polymers prepared by reaction of at least two polymer forming reactive, monomeric compounds.

The term "water-borne polymer emulsions" means an emulsion that includes at least one polymer formed or dispersed in water containing media.

The designation (meth)acrylate and similar designations are used herein as an abbreviated notation for "acrylate and/or methacrylate".

The term "oil-soluble initiator" means an initiator that has a solubility of less than 1 g per 100 g of DI water at 20° C. under 1 atm. While the term "water-soluble initiator" means an initiator that has a solubility of at least 1 g per 100 g of DI water at 20° C. under 1 atm.

All percentages and ratios denote weight percentages and weight ratios unless otherwise specified.

The present invention relates to water-borne polymers polymerized by radical polymerization with azo initiators, which show superior water-whitening resistance and scrub resistance properties. The azo initiators are of Formula I:

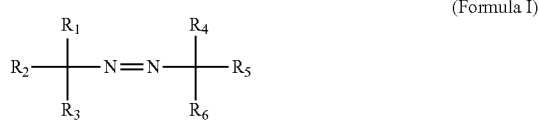

(Formula I)

Wherein the $R_1$-$R_6$, independently of each other, stand for, but not limited to, H, C1-C12 alkyl groups, C5-C12 cyclic alkyl groups, heterocyclic groups, nitrile group, carboxylic esters, amides, ethers, alkoxy groups and acetyl groups. It's preferable that the azo initiators have a solubility of less than 1 g per 100 g of DI water at 20° C. under 1 atm and, more preferably, that the azo initiators have a solubility of less than 1 g per 100 g of DI water at 20° C. under 1 atm and comprise nitrile groups.

Most azo initiators having a half-life of 10-hour at a temperature below 100° C. are suitable for the present invention. The azo initiators can be nitrile free compounds. For example, $R_1$, $R_2$, $R_4$ and $R_5$ can be, independently of each other, alkyl groups while the $R_3$ and $R_6$ groups can be, independently of each other, selected from other functional groups, such as amidines (examples of such azo compounds include 2,2'-Azobis[N-(2-carboxyethyl)-2-methylpropionamidine]tetrahydrate and 2,2'-Azobis(2-methylpropionamidine)-dihydrochloride), imidazolins (examples of such azo compounds include 2,2'-Azobis[2-(2-imidazolin-2-yl)propane]-dihydrochloride and 2,2-'Azobis[2-(2-imidazolin-2-yl)propane]), amides (examples of such azo compounds include 2,2'-azobis 2-methyl-n-1,1-bis(hydroxymethyl)-2-hydroxyethyl propionamide and 2,2'-Azobis[2-methyl-N-(2-hydroxyethyl)propionamide]) and esters (examples of such azo compounds include Dimethyl 2,2'-azobis(2-methylpropionate)). The azo initiators can also be selected from nitrile containing compounds. For example, $R_3$ and $R_6$ can be both nitrile groups while $R_1$, $R_2$, $R_4$ and $R_5$ can, independently from each other, be selected from alkyl groups (examples of such azo compounds include 2,2'-Azobis(2-methylbutyronitrile), 2,2'-Azobis(isobutyronitrile), 2,2'-Azobis(2,4-dimethylvaleronitrile) and 2,2'-Azobis(4-methoxy-2,4-dimethylvaleronitrile)). Other azo compounds, such as 4,4'-Azobis(4-cyanovaleric acid) and 1,1'-Azobis (cyclohexane-1-carbonitrile) shall also be able to be used in the present invention.

Both oil-soluble initiators and water-soluble initiators may be used for the present invention. The oil-soluble initiators and water-soluble initiators can be used alone or a mixture of at least one oil-soluble initiator and at least one water-soluble initiator can be applied. In the case of multistage polymerization, the initiator for each stage may be the same or different.

The initiator is usually used in an amount of no more than 10% by weight, preferably 0.02 to 5% by weight, more preferably 0.1 to 2 wt %, based on the total weight of all the monomers used for the emulsion polymerization.

Monomers for the polymer may comprise at least one hydrophobic monoethylenically unsaturated monomer and at least one hydrophilic monoethylenically unsaturated monomer.

The at least one hydrophobic monoethylenically unsaturated monomer may be selected from, but not limited to, (meth)acrylate monomers, (meth)acrylonitrile monomers, styrene monomers, vinyl alkanoate monomers, monoethylenically unsaturated di- and tricarboxylic ester monomers or a mixture thereof.

Particularly, the (meth)acrylate monomers may be $C_1$-$C_{19}$-alkyl (meth)acrylates, for example, but not limited to, methyl (meth)acrylate, ethyl (meth)acrylate, n-butyl (meth)acrylate, 2-ethylhexyl (meth)acrylate, cyclohexyl (meth)acrylate, n-octyl (meth)acrylate, n-decyl (meth)acrylate, n-dodecyl (meth)acrylate (i.e. lauryl (meth)acrylate), tetradecyl (meth)acrylate, oleyl (meth)acrylate, palmityl (meth)acrylate, stearyl (meth)acrylate, isobornyl (meth)acrylate, benzyl (meth)acrylate, phenyl (meth)acrylate and a mixture thereof.

Particularly, the styrene monomers may be unsubstituted styrene or $C_1$-$C_6$-alkyl substituted styrenes, for example, but not limited to, styrene, α-methylstyrene, ortho-, meta- and para-methylstyrene, ortho-, meta- and para-ethylstyrene, o,p-dimethylstyrene, o,p-diethylstyrene, ispropylstyrene, o-methyl-p-isopropylstyrene or any mixture thereof.

Particularly, the vinyl alkanoate monomers may be vinyl esters of $C_2$-$C_{11}$-alkanoic acids, for example, but not limited to, vinyl acetate, vinyl propionate, vinyl butanoate, vinyl valerate, vinyl hexanoate, vinyl versatate or a mixture thereof.

Particularly, the monoethylenically unsaturated di- and tricarboxylic ester monomers may be full esters of monoethylenically unsaturated di- and tricarboxylic acids, for example, but not limited to, diethyl maleate, dimethyl fumarate, ethyl methyl itaconate, dihexyl succinate, didecyl succinate or any mixture thereof.

In a preferred embodiment according to the present invention, one or more $C_1$-$C_{12}$-alkyl (meth)acrylates, such as methyl (meth)acrylate, ethyl (meth)acrylate, n-butyl (meth)acrylate, 2-ethylhexyl (meth)acrylate, styrene or a mixture thereof is chosen as the at least one hydrophobic monoethylenically unsaturated monomer.

The at least one hydrophobic monoethylenically unsaturated monomer may be in an amount of at least 80 wt %, preferably at least 85 wt %, more preferably at least 90 wt % and most preferably at least 95 wt %, all based on the total weight of all monomers.

The at least one hydrophilic monoethylenically unsaturated monomer may be monoethylenically unsaturated monomers containing at least one functional group selected from, but not limited to, a group consisting of carboxyl, carboxylic anhydride, sulfonic acid, phosphoric acid, hydroxyl and amide.

Particularly, the hydrophilic monoethylenically unsaturated monomer include, but are not limited to, monoethylenically unsaturated carboxylic acids, such as (meth)acrylic acid, itaconic acid, fumaric acid, citraconic acid, sorbic acid, cinnamic acid, glutaconic acid and maleic acid; monoethylenically unsaturated carboxylic anhydrides, such as itaconic acid anhydride, fumaric acid anhydride, citraconic acid anhydride, sorbic acid anhydride, cinnamic acid anhydride, glutaconic acid anhydride and maleic acid anhydride; monoethylenically unsaturated amides, such as (meth)acrylamide, N-methylol (meth)acrylamide, N,N-dimethylacrylamide (DMA), 2-hydroxyethyl (meth)acrylamide, dimethylaminoethylmethacrylamide; hydroxyalkyl esters of monoethylenically unsaturated carboxylic acids, such as hydroxyethyl (meth)acrylate and hydroxypropyl (meth)acrylate; and other monomers, such as glycerol (meth)acrylate, or a mixture thereof.

In a preferred embodiment according to the present invention, acrylic acid, methacrylic acid, acrylamide or a mixture thereof is the preferred at least one hydrophilic monoethylenically unsaturated monomer.

The hydrophilic monoethylenically unsaturated monomer can be in an amount of at least 0.1% by weight and no more than 20% by weight, preferably no more than 15% by weight, more preferably no more than 10% by weight, and mostly preferably no more than 5% by weight, based on the total weight of the monomers to make the polymer.

The monomers for the present invention may further comprise one or more crosslinking monomers (c). The crosslinking monomers can be chosen from, but not limited to, di- or poly-isocyanates, polyaziridines, polycarbodiimide, polyoxazolines, glyoxals, malonates, triols, epoxy molecules, organic silanes, carbamates, diamines and triamines, hydrazides, carbodiimides and multi-ethylenically unsaturated monomers. In the present invention, suitable crosslinking monomers include, but not limited to, glycidyl (meth)acrylate, N-methylol(meth)acrylamide, (isobutoxymethyl)acrylamide, vinyltrialkoxysilanes such as vinyltrimethoxysilane; alkylvinyldialkoxysilanes such as dimethoxymethylvinylsilane; (meth)acryloxyalkyltrialkoxysilanes such as (meth)acryloxyethyltrimethoxysilane, (3-acryloxypropyl)trimethoxysilane and (3-methacryloxypropyl)trimethoxysilane; allyl (meth)acrylate, diallyl phthalate, 1,4-butylene glycol dimethacrylate, 1,2-ethylene glycol dimethacrylate, 1,6-hexanediol diacrylate, divinyl benzene or any mixture thereof.

The crosslinker can be added in an amount of no more than 10% by weight, preferably no more than 8% by weight, more preferably in the range of 0.05 to 5% by weight, based on the total weight of the all monomers used for the synthesis of polymers.

The monomers could further include other suitable polymerizable compounds, which include, but not limited to, olefins, such as ethylene, propene, cloropropene, butene, 1-decene; dienes, such as butadiene, isoprene, cloroprene, norbornadiene; N-vinyl compounds, such as N-vinyl-2-pyrrolidone (NVP), N-vinyl formamide, N-vinyl acetamide, N-vinyl isopropylamide, N-vinyl-N-methyl acetamide and N-vinyl caprolactam.

During the polymerization process, most surfactants known to the skilled person in the art may be used. Surfactant to be used according to the present invention may be a non-reactive surfactant, a reactive surfactant or a combination thereof. Surfactants may be formulated together with the monomers and fed into a reaction reactor. Alternatively, the surfactants may be added into the reaction medium first followed by the feeding of monomers. Surfactants may be used in a suitable amount known to the skilled person in the art, for example, in a total amount of 0.1% to 6% by weight, based on the total weight of the monomers.

Surfactants may be non-reactive anionic and/or nonionic surfactants. Suitable non-reactive anionic surfactants, for example, include, but are not limited to, alkyl, aryl or alkylaryl sulfate salts, sulfonate salts or phosphate salts; alkyl sulfonic acids; sulfosuccinate salts; fatty alcohol ether sulfate salts and fatty acids. Suitable non-reactive nonionic surfactants for example include alcohol or phenol ethoxylates such as polyoxyethylene alkylphenyl ether.

Surfactants may also be polymerizable surfactants, also called a reactive surfactant, containing at least one ethylenically unsaturated functional group. Suitable polymerizable surfactants include, but are not limited to, allyl polyoxyalkylene ether sulfate salts such as sodium salts of allyl polyoxyethylene alkyl ether sulfate, allyl alkyl succinate sulfonate salts, allyl ether hydroxyl propanesulfonate salts such as sodium salts, polyoxyethylene styrenated phenyl ether sulfate salts such as ammonium salts, for example DKS Hitenol® AR 1025 and DKS Hitenol® AR 2020, polyoxyethylene alkylphenyl ether sulfate ammonium salts, polyoxyethylene allyloxy nonylphenoxypropyl ether, and phosphate acrylates such as SIPOMER® PAM 100, phosphate acrylates such as SIPOMER® PAM 200, etc.

An organic base and/or inorganic base may be added into the polymerization system as a neutralizer during the polymerization or after the completion of such process. Suitable neutralizers include, but are not limited to, inorganic bases such as ammonia, sodium/potassium hydroxide, sodium/potassium carbonate or a combination. Organic bases such as dimethyl amine, diethyl amine, triethyl amine, monoethanolamine, triethanolamine, or a mixture thereof can also be used as the neutralizer. Among others, sodium hydroxide, ammonia, dimethylaminoethanol, 2-amino-2-methyl-1-propanol or any mixture thereof are preferable as the neutralizer useful for the polymerization process. Upon the addition of a neutralizer, pH of the final polymer emulsion shall be in the range of 7.0 to 10.0, preferably in the range of 7.0 to 9.5, more preferably in the range of 7.0 to 9.0.

For the purpose of the present invention, the polymer may have a weight-average molecular weight (Mw) in the range of 10,000 to 3,000,000, preferably from 20,000 to 2,500,000, more preferably from 50,000 to 2,500,000, and most preferably from 100,000 to 2,500,000, as measured by Gel Permeation Chromatography (GPC) against polystyrene standard in tetrahydrofuran.

In the present invention, it's preferable to have a polymer with a calculated Fox Tg in the range of −50° C. to +30° C., preferably in the range of −30° C. to +20° C., more preferably in the range of −20° C. to +15° C., and most preferably in the range of −20° C. to +10° C.

Within the context of the present application, the term Fox Tg refers to a glass transition temperature Tg as calculated according to the following Fox equation as disclosed in T. G. Fox, Bulletin of the American Physical Society, Volume 1, Issue No. 3, page 123 (1956):

$$1/Tg = W_1/Tg_1 + W_2/Tg_2 + \ldots + W_n/Tg_n$$

wherein $W_1, W_2, \ldots W_n$, are the mass fractions of the monomers 1, 2, . . . n, respectively, and $Tg_1, Tg_2, \ldots Tg_n$, are the glass transition temperatures of homopolymers of the monomers 1, 2, . . . n in degrees Kelvin, respectively.

The Tg values for homopolymers of the majority of monomers are known and are listed in, for example, Ullmann's Encyclopedia of Industrial Chemistry, Vol. 5, Vol. A21, page 169, VCH Weinheim, 1992. Other sources of glass transition temperatures of homopolymers include, for example, J. Brandrup, E. H. Immergut, Polymer Handbook, 1st Edition, J. Wiley, New York 1966, 2nd Edition, J. Wiley, New York 1975, and 3rd Edition, J. Wiley, New York 1989.

The emulsion polymerization may be conducted in the form of a feed process (i.e. the reaction mixture is fed into the reactor in a staged or gradient procedure). In such a process, a small portion of the reaction mixture of the first-stage monomers is introduced as an initial charge and heated to the polymerization temperature which usually will result in polymer seeds. Then the remainder the polymerization mixture of is supplied to the reactor continuously in the course of the polymerization process, usually by way of two or more spatially separate feed streams. After the completion of the feeding, the reaction mixture may be subject to oxidants, neutralizing agents, etc. For multistage polymerization, after the addition of the first portion of reaction mixture, the reaction is paused for another 10 to 30 min and, optionally, followed by complete or partial neutralization of the mixture. After the completion of the first-stage polymerization, polymerization mixture of the second-stage monomers is supplied to the reactor in the same manner as described above. Upon the completion of the feeding, the polymerization may be kept for another 30 to 90 min. Afterwards, the reaction mixture may be subject to oxidants, neutralizing agents, etc.

In the present invention, when one or more oil-soluble initiators is applied, it's preferable to add the initiator together with monomers. For example, the oil-soluble initiators can be first mixed with monomers and the mixture is fed into the reactant with continuous feeding during the polymerization process. The initiators can also be added to the reaction vessel directly, or first dissolved in a small amount of organic solvent and then fed into the reaction system, or first dissolved in a small amount of organic solvent and mixed with monomers which are then fed into the reaction system.

The polymerization may be carried out and maintained at a temperature lower than 100° C. throughout the course of the reaction. Preferably, the polymerization is carried out at a temperature between 60° C. and 95° C. Depending on various polymerization conditions, the polymerization may be carried out for several hours, for example 2 to 8 hours.

The polymer emulsion according to the present invention can be formulated with further components to produce coatings, such as pigment, filler, solvent, water, and further additives such as preservative, thickener, dispersant and defoamer.

Suitable pigment includes, for example, inorganic white pigments, such as titanium dioxide, barium sulfate, zinc oxide, zinc sulfide, basic lead carbonate, antimony trioxide, and lithopones; inorganic colored pigments, such as iron oxides, carbon black, graphite, zinc yellow, zinc green, Ultramarin, manganese black, antimony black, and manganese violet; organic color pigments, such as indigo, azo dyes, anthraquinoids and indidental dyes, as well as dioxazine, quinacridone, phthalocyanine, isoindolinone and metal complex pigments. Also suitable are synthetic white pigments with air inclusions for increasing light scattering, such as the Rhopaque® dispersions. The pigment may be present in an amount of 20 to 80 wt %, preferably 50 to 75 wt % in the case of wall paints, or in an amount of no more than 25 wt %, preferably no more than 15 wt %, most preferably no more than 10 wt % in the case of transparent or semi-transparent coatings, based on the total weight of the coating composition.

Suitable filler includes, for example, kaolin, talc, mica, magnesite, alkaline earth carbonates such as calcite or chalk, magnesium carbonate, dolomite, alkaline earth sulfates such as calcium sulfate, silicon compounds such as silicon dioxide or aluminum silicates or magnesium aluminum silicates, and aluminum oxide or aluminum oxide hydrate. The filler may be present in an amount of 1 to 90 wt %, preferably 20 to 60 wt % in the case of wall paint, or in an amount of no more than 5 wt %, preferably no more than 2 wt %, most preferably no more than 1 wt % in the case of transparent or semi-transparent coatings, based on the total weight of the coating composition.

Suitable organic solvent includes, for example, trimethylpentane, propylene glycol or dipropylene glycol butyl ether. The organic solvent may be present in an amount of less than 5 wt %, based on the total weight of the coating composition.

Suitable preservative includes, for example, isothiazolinone preparations such as 2-methyl-2H-isothiazol-3-one or 1,2-benzisothiazolin-3H-one. The preservative may be present in an amount of less than 2 wt %, preferably less than 0.3 wt %, based on the total weight of the coating composition.

Suitable thickener includes, for example, cellulose ethers, bentonite, polysaccharides, fumed silica, phyllosilicates, or polyurethane thickeners. The thickener may be present in an amount of less than 1 wt %, preferably less than 0.6 wt %, based on the total weight of the coating composition.

Suitable dispersant includes, for example, alkylbenzenesulfonates, polycarboxylates, fatty acid amines or salts of polyacrylic acids. The dispersant may be present in an amount of less than 2 wt %, preferably 0.001 to 0.5 wt %, based on the total weight of the coating composition.

Suitable defoamer includes, for example, poly(organo) siloxanes, silicone oils or mineral oils. The defoamer may be present in an amount of less than 1 wt %, more preferably 0 to 0.5 wt %, based on the total weight of the coating composition.

The present invention is further demonstrated and exemplified in the Examples, however, without being limited to the embodiments described in the Examples.

EXAMPLES

Description of commercially available materials used in the following Examples:

Disponil® FES27, from BASF, sodium lauryl ether sulphate.

Esacure TZM, from Lamberti SPA Company, mixture of benzophenone and 4-methylbenzophenone.

Silquest®A171, Silquest®A187, from Momentive, silane additive.

Rongalit® Discharge C, from BASF, sulfinic acid derivative.

Herein, the weight average molecular weight, unless otherwise indicated, was measured by Gel Permeation Chromatography (GPC) against polystyrene standard in THF.

Preparation of Seed A solution 24 g of DI water and 3 g of 25% aqueous sodium dodecyl sulfate solution were added into a reactor and heated to 85° C. in 30 min. Separately, a premix of 25 g of styrene, 25 g of 25% aqueous sodium dodecyl sulfate solution and 25 g of DI water was prepared. Then the premix and 14 g of 7% aqueous sodium persulfate solution were fed into the reactor simultaneously from different feeding channels over 90 minutes. After polymerization, the reaction system was maintained at a temperature of 85° C. for 30 minutes and then cooled down to 25° C.

Example 1-1

252.9 g of DI water and 14.5 g of Seed A solution were added into a reactor and heated up to 70° C. Separately, 7.54 g of AIBN was dissolved in a mixture containing 107.5 g of 2-ethylhexyl acrylate (2-EHA), 107.5 g of n-butyl acrylate (BA), 228.45 g of methyl methacrylate (MMA), 4.5 g of methacrylic acid (MAA) and 1.8 g Silquest A171. Then, 24.61 g of Disponil FES27 and 183.56 g of DI water were added to the AIBN containing mixture to obtain a pre-emulsion. When the temperature of the reaction mixture in the reactor stabilized at 70° C., the pre-emulsion was fed into the reactor over 180 minutes continuously. Then, the temperature was decreased to 60° C. in 15 minutes and a mixture containing 1.13 g of 10 wt % tert-butyl hydroperoxide (t-BHP) aqueous solution and 12.91 g of 0.6 wt % $NaHSO_3$ aqueous solution was added simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 10° C. and Mw of 780,000.

Example 1-2

252.9 g of DI water and 14.5 g of Seed A solution were added into a reactor and heated up to 70° C. Separately, 7.54 g of AIBN was dissolved in a mixture containing 107.5 g of 2-ethylhexyl acrylate (2-EHA), 107.5 g of n-butyl acrylate (BA), 228.45 g of methyl methacrylate (MMA), 4.5 g of methacrylic acid (MAA) and 1.8 g Silquest A171. Then, 24.61 g of Disponil FES27 and 183.56 g of DI water were added to the AIBN containing mixture to obtain a pre-emulsion. When the temperature of the reaction mixture in the reactor stabilized at 70° C., the pre-emulsion was fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % $NaHSO_3$ aqueous solution was added simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 10° C. and Mw of 1,800,000.

Comparative Example 1-1

160 g of DI water and 14.5 g of Seed A solution were added into a reactor and heated up to 85° C. Separately, 107.5 g of 2-ethylhexyl acrylate (2-EHA), 107.5 g of n-butyl acrylate (BA), 228.45 g of methyl methacrylate (MMA), 4.5 g of methacrylic acid (MAA) and 1.8 g Silquest A171, 24.61 g of Disponil FES27 and 134 g of water were mixed together to produce a pre-emulsion. When the temperature of the reaction mixture in the reactor stabilized at 85° C., the pre-emulsion and 156.17 g of 7 wt % aqueous sodium persulfate (NaPS) solution were fed into the reactor over 180 minutes simultaneously. Then, the temperature was decreased to 60° C. in 15 minutes and a mixture containing 1.13 g of 10 wt % tert-butyl hydroperoxide (t-BHP) aqueous solution and 12.91 g of 0.6 wt % $NaHSO_3$ aqueous solution was added simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 10° C. and Mw of 371,000.

Comparative Example 1-2

160 g of DI water and 14.5 g of Seed A solution were added into a reactor and heated up to 60° C. Separately, 107.5 g of 2-ethylhexyl acrylate (2-EHA), 107.5 g of n-butyl acrylate (BA), 228.45 g of methyl methacrylate (MMA), 4.5 g of methacrylic acid (MAA) and 1.8 g Silquest A171, 24.61 g of Disponil FES27 and 100 g of water were mixed together to produce a pre-emulsion. When the temperature of the reaction mixture in the reactor stabilized at 60° C., 228 g t-BHP solution (10 wt % aqueous solution) was added to the reactor in 5 min. Then, the pre-emulsion and 104.7 g of Rongalit Discharge C were fed into the reactor over 180 minutes simultaneously. Then, a mixture containing 1.13 g of 10 wt % tert-butyl hydroperoxide (t-BHP) aqueous solution and 12.91 g of 0.6 wt % $NaHSO_3$ aqueous solution was added simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 10° C. and Mw of 97,000.

Example 2-1

252.9 g of DI water and 14.5 g of Seed A solution were added into a reactor and heated up to 70° C. Separately, 7.54 g of AIBN was dissolved in a mixture containing 123.14 g of 2-ethylhexyl acrylate (2-EHA), 123.14 g of n-butyl acrylate (BA), 197.16 g of methyl methacrylate (MMA), 4.5 g of methacrylic acid (MAA) and 1.8 g Silquest A171. Then, 24.61 g of Disponil FES27 and 183.56 g of DI water were added to the AIBN containing mixture to obtain a pre-emulsion. When the temperature of the reaction mixture in the reactor stabilized at 70° C., the pre-emulsion was fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % $NaHSO_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 0° C. and Mw of 1,900,000.

Comparative Example 2-1

160 g of DI water and 14.5 g of Seed A solution were added into a reactor and heated up to 85° C. Separately, 123.14 g of 2-ethylhexyl acrylate (2-EHA), 123.14 g of n-butyl acrylate (BA), 197.16 g of methyl methacrylate (MMA), 4.5 g of methacrylic acid (MAA) and 1.8 g Silquest A171, 24.61 g of Disponil FES27 and 134 g of water were mixed together to produce a pre-emulsion. When the temperature of the reaction mixture in the reactor stabilized at 85° C., the pre-emulsion and 156.17 g of 7 wt % aqueous sodium persulfate (NaPS) solution were fed into the reactor over 180 minutes simultaneously. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 0° C. and Mw of 600,000.

Comparative Example 2-2

160 g of DI water and 14.5 g of Seed A solution were added into a reactor and heated up to 60° C. Separately, 123.14 g of 2-ethylhexyl acrylate (2-EHA), 123.14 g of n-butyl acrylate (BA), 197.16 g of methyl methacrylate (MMA), 4.5 g of methacrylic acid (MAA) and 1.8 g Silquest A171, 24.61 g of Disponil FES27 and 134 g of water were mixed together to produce a pre-emulsion. When the temperature of the reaction mixture in the reactor stabilized at 60° C., 228 g t-BHP solution (10 wt % aqueous solution) was added to the reactor in 5 min. The pre-emulsion and 104.7 g of Rongalit Discharge C were fed into the reactor over 180 minutes simultaneously. Then, a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 0° C. and Mw of 333,000.

Example 3-1

252.9 g of DI water and 14.5 g of Seed A solution were added into a reactor and heated up to 70° C. Separately, 7.54 g of AIBN was dissolved in a mixture containing 124.3 g of 2-ethylhexyl acrylate (2-EHA), 124.3 g of n-butyl acrylate (BA), 194.85 g of styrene (ST), 4.5 g of methacrylic acid (MAA) and 1.8 g Silquest A171. Then, 24.61 g of Disponil FES27 and 183.56 g of DI water were added to the AIBN containing mixture to obtain a pre-emulsion. When the temperature of the reaction mixture in the reactor stabilized at 70° C., the pre-emulsion was fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 0° C. and Mw of 366,000.

Comparative Example 3-1

160 g of DI water and 14.5 g of Seed A solution were added into a reactor and heated up to 85° C. Separately, 124.3 g of 2-ethylhexyl acrylate (2-EHA), 124.3 g of n-butyl acrylate (BA), 194.85 g of styrene (ST), 4.5 g of methacrylic acid (MAA) and 1.8 g Silquest A171, 24.61 g of Disponil FES27 and 134 g of water were mixed together to produce a pre-emulsion. When the temperature of the reaction mixture in the reactor stabilized at 85° C., the pre-emulsion and 156.17 g of 7 wt % aqueous sodium persulfate (NaPS) solution were fed into the reactor over 180 minutes simultaneously. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 0° C. and Mw of 150,000.

Comparative Example 3-2

160 g of DI water and 14.5 g of Seed A solution were added into a reactor and heated up to 60° C. Separately, 124.3 g of 2-ethylhexyl acrylate (2-EHA), 124.3 g of n-butyl acrylate (BA), 194.85 g of styrene (ST), 4.5 g of methacrylic acid (MAA) and 1.8 g Silquest A171, 24.61 g of Disponil FES27 and 100 g of water were mixed together to produce a pre-emulsion. When the temperature of the reaction mixture in the reactor stabilized at 60° C., 228 g t-BHP solution (10 wt % aqueous solution) was added to the reactor in 5 min. Then, the pre-emulsion and 104.7 g of Rongalit Discharge C were fed into the reactor over 180 minutes simultaneously. Then, a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer emulsion was un-stable, therefore, no Tg or Mw was obtained.

Example 4-1

The same experiment as Example 1-1 was repeated with the exception that the amount of AIBN was reduced to 3.77 g. The resulted polymer has a Tg of 10° C. and Mw of 1,000,000.

Example 4-2

The same experiment as Example 1-2 was repeated with the exception that the amount of AIBN was reduced to 3.77 g. The resulted polymer has a Tg of 10° C. and Mw of 1,400,000.

Example 5

The same experiment as Example 1-2 was repeated with the exception that AIBN was replaced by 8.83 g V59. The resulted polymer has a Tg of 10° C. and Mw of 1,780,000.

Example 6

The same experiment as Example 1-2 was repeated with the exception that AIBN was replaced by 10.57 g V601. The resulted polymer has a Tg of 10° C. and Mw of 1,130,000.

Example 7

252.9 g of DI water and 14.5 g of Seed A solution were added into a reactor and heated up to 70° C. Separately, 7.65 g of AIBN was dissolved in 38.25 g of acetone. Then, 24.61 g of Disponil FES27, 183.56 g of DI water, a mixture containing 122.83 g of 2-ethylhexyl acrylate (2-EHA), 122.83 g of n-butyl acrylate (BA), 196.66 g of methyl methacrylate (MMA), 4.5 g of methacrylic acid (MAA) and 1.8 g Silquest A171 were mixed together to obtain a pre-emulsion. When the temperature of the reaction mixture in the reactor stabilized at 70° C., the pre-emulsion and the AIBN acetone solution were fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. The resulted emulsion was steamed striped to remove the acetone. Finally, the solid content of the mixture was adjusted to 40 wt % by adding certain amount of DI water. The resulted polymer has a Tg of 0° C. and Mw of 2,070,000.

Example 8

252.9 g of DI water and 14.5 g of Seed A solution were added into a reactor and heated up to 70° C. Separately, 7.65 g of AIBN was dissolved in 191.25 g of toluene. Then, 24.61 g of Disponil FES27, 183.56 g of DI water, a mixture containing 122.83 g of 2-ethylhexyl acrylate (2-EHA), 122.83 g of n-butyl acrylate (BA), 196.66 g of methyl methacrylate (MMA), 4.5 g of methacrylic acid (MAA) and 1.8 g Silquest A171 were added to the AIBN containing mixture to obtain a pre-emulsion. When the temperature of the reaction mixture in the reactor stabilized at 70° C., the pre-emulsion was fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of 0° C. and Mw of 390,000.

Example 9

252.9 g of DI water and 14.5 g of Seed A solution were added into a reactor and heated up to 70° C. Separately, 7.54 g of AIBN was dissolved in a mixture containing 139.9 g of 2-ethylhexyl acrylate (2-EHA), 139.9 g of n-butyl acrylate (BA), 162.9 g of methyl methacrylate (MMA), 4.5 g of methacrylic acid (MAA) and 1.8 g Silquest A171. Then, 24.61 g of Disponil FES27 and 183.56 g of DI water were added to the AIBN containing mixture to obtain a pre-emulsion. When the temperature of the reaction mixture in the reactor stabilized at 70° C., the pre-emulsion was fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of −10° C. and Mw of 2,350,000.

Example 10

252.9 g of DI water 7.54 g of AIBN and 14.5 g of Seed A solution were added into a reactor and heated up to 70° C. Separately, 139.9 g of 2-ethylhexyl acrylate (2-EHA), 139.9 g of n-butyl acrylate (BA), 162.9 g of methyl methacrylate (MMA), 4.5 g of methacrylic acid (MAA) and 1.8 g Silquest A171, 24.61 g of Disponil FES27 and 183.56 g of DI water were mixed together to obtain a pre-emulsion. When the temperature of the reaction mixture in the reactor stabilized at 70° C., the pre-emulsion was fed into the reactor over 180 minutes continuously. After the feeding was completed, the temperature of the reaction mixture in the reactor was raised to 90° C. in 15 minutes and the temperature was kept at 90° C. for another 2 hours. Then, the temperature was decreased to 60° C. in 15 minutes and a mixture containing 1.13 g of 10 wt % tert-butyl hydroperoxide (t-BHP) aqueous solution and 12.91 g of 0.6 wt % NaHSO$_3$ aqueous solution was added into the mixture simultaneously in 10 minutes. Afterwards, the temperature was further decreased to 20° C. and a mixture containing 41.77 g of 5 wt % triethylamine (TEA) aqueous solution, 1.8 g of Silquest A187 and 2.89 g of 20 wt % ammonia solution was added into the mixture. Finally, the solid content of the mixture was adjusted to 40 wt % by adding certain amount of DI water. The resulted polymer has a Tg of −10° C. and Mw of 871,000.

Formulation of Paints

Formulate 522 g of the resulting latex as prepared in the Examples or Comparative Examples with 102 g of demineralized DI-water, 5 g of dispersant A40 from BASF, 1 g of defoamer SE-2 from BASF, 198 g of TiO$_2$ R706 from Dupant, 140 g of CaCO$_3$ Omyacarb® 5 from Omya, 15 g of Loxanol® from BASF, 3 g of Natrosol® 250HBR from Ashland and 10 g of propylene glycol from Sinopharm Reagent Company, 1.5 g ammonia from Sinopharm Reagent Company, 2.5 g 50% Collacral LR8990 from BASF. The pigment volume concentration of the resulting composition is around 34%.

Performance Test

The water-whitening resistance (WWVR) test of the dispersions were performed as follow: each obtained dispersion was drawn down on a Leneta foil P121-10N card with doctor blading to obtain a wet film having a thickness of 100 μm (microns). Then the coated card was dried in an oven at a temperature of 50° C. for 30 min. After the coated card was cooled to 20° C., the obtained panel was immersed in water for at a temperature of 20° C. for 8 hr or 24 hr. Water whitening result of the clear film was monitored by a colorimeter which measures ΔL value to evaluate the color development of the coated card. The whitening difference was finally described as ΔL=Mean(L1-L0). The L1 was the L value after water treatment and L0 was the L value before dipping into water.

The scrub resistance test was performed according to ASTM D 2486. The paints were applied onto a Leneta foil P121-10N with a with a wet thickness of about 200 μm. After drying for 7 days at 23° C. and 50% relative humidity, the paint films were inserted into a Washability & Wear Tester, model D10V (Gardco), coated with 5 mL destilled water and scrubbed with a Nylon brush, which was pre-treated with 10 g of Abrasive Leneta Scrub Media SC-2. After 400 cycles, the treatment with water and abrasive fluid was repeated. Reported is the number of scrub cycles which is needed to completely remove the paint film over a length of 1 cm.

TABLE 1

|  | Initiator | Tg (° C.) | Mw (Kda) | Scrub Resistance (cycles) | WWR (Δ L) 8 h | WWR (Δ L) 24 h |
|---|---|---|---|---|---|---|
| Exp 1-1 | AIBN | 10 | 780 | >4000 | 1.1 | 4.9 |
| Exp 1-2 | AIBN | 10 | 1,800 | >4000 | 1.2 | 5.2 |
| Com. Exp 1-1 | NaPS | 10 | 371 | 2430 | 13.5 | / |
| Com. Exp 1-2 | Redox | 10 | 97 | 700 | 19.2 | / |
| Exp 2-1 | AIBN | 0 | 1,900 | >4000 | 1.5 | 5.8 |
| Com. Exp 2-1 | NaPS | 0 | 600 | 2362 | 3.9 | 13.8 |
| Com. Exp 2-2 | Redox | 0 | 333 | 1650 | 2.7 | 15.6 |
| Exp 3-1 | AIBN | 0 | 366 | >4000 | 2 | 7.8 |
| Com. Exp 3-1 | NaPS | 0 | 150 | 3062 | 2.4 | 14.9 |
| Com. Exp 3-2 | Redox | 0 | N.A. | / | / | / |
| Exp 4-1 | AIBN | 10 | 1,000 | >4000 | 0.9 | 4.3 |
| Exp 4-2 | AIBN | 10 | 1,400 | >4000 | 1.3 | 5.5 |
| Exp 5 | V-59 | 10 | 1,780 | >4000 | 0.9 | 4.1 |
| Exp 6 | V-601 | 10 | 1,130 | >4000 | 1.6 | 9.2 |
| Exp 7 | AIBN | 0 | 2,070 | >4000 | 1.8 | 5.8 |
| Exp 8 | AIBN | 0 | 390 | >4000 | 1.7 | 6.6 |
| Exp 9 | AIBN | -10 | 2,350 | >4000 | 1.2 | 5 |
| Exp 10 | AIBN | -10 | 871 | >4000 | 1 | 5.3 |

Comparative examples 2-1, 2-2 and 3-1 show significant color development after 24 hours (i.e. ΔL value is higher than 10) while comparative examples 1-1 and 1-2 show significant color development even after 8 hours (i.e. ΔL value is higher than 10). In contrast, polymer emulsions obtained with Azo initiators show superior water-whitening resistance properties (i.e. ΔL value is less than 5 after 8 hours and less than 10 after 24 hours). In addition, paints formulated with polymer emulsions obtained with Azo initiators also show excellent scrub resistance (i.e. the paint can survive more than 4000 cycles of scrub test). And, Azo initiators can be applied to synthesize polymers with different molecular weight and polymers with different monomer compositions.

However, the present invention is not to be limited in scope by the specific embodiments and examples described herein. Indeed, various modifications of the invention in addition to those described herein will become apparent to those skilled in the art from the foregoing description. Such modifications are intended to fall within the scope of the appended claims.

The invention claimed is:

1. A water-borne polymer polymerized by radical polymerization with azo initiators, wherein the azo initiators have the following structure:

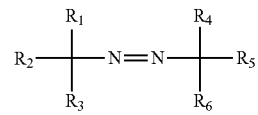

wherein the $R_1$-$R_6$ independently of each other stand for H, C1-C12 alkyl groups, C5-C12 cyclic alkyl groups, heterocyclic group, nitrile group, carboxylic esters, amides, ethers, alkoxy groups or acetyl groups, wherein the polymer is obtained from a monomer composition comprising at least 80 wt % hydrophobic monoethylenically unsaturated monomer selected from a group consisting of (meth)acrylate monomers, (meth)acrylonitrile monomers, styrene monomers, vinyl alkanoate monomers, monoethylenically unsaturated di- and tri-carboxylic ester monomers and a mixture thereof, and at least 0.1% by weight and no more than 20% by weight hydrophilic monoethylenically unsaturated monomer selected from the group consisting of monoethylenically unsaturated carboxylic acids, monoethylenically unsaturated carboxylic anhydrides, monoethylenically unsaturated amides, hydroxyalkyl esters of monoethylenically unsaturated carboxylic acids, glycerol (meth) acrylate and a mixture thereof, based on the total weight of the monomers to make the polymer, and the polymer has a calculated Fox Tg in the range of −50° C. to +30° C.

2. The polymer according to claim 1, wherein the at least one hydrophobic monoethylenically unsaturated monomer is $C_1$-$C_{19}$-alkyl (meth) acrylate.

3. The polymer according to claim 1, wherein the at least one hydrophilic monoethylenically unsaturated monomer is (meth) acrylic acid.

4. The polymer according to claim 1, wherein the polymer has a weight average molecular weight (Mw) in the range of 10,000 to 3,000,000.

5. The polymer according to claim 1, wherein the azo initiators have a solubility of less than 1 g per 100 g of DI water at 20° C. under 1 atm.

6. The polymer according to claim 1, wherein the azo initiators have at least one nitrile group.

7. A process for the production of a water-borne polymer polymerized by radical polymerization with azo initiators, wherein the azo initiators have the following structure:

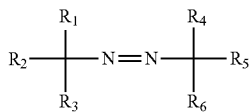

wherein the $R_1$-$R_6$ independently of each other stand for H, C1-C12 alkyl groups, C5-C12 cyclic alkyl groups, heterocyclic group, nitrile group, carboxylic esters, amides, ethers, alkoxy groups or acetyl groups, and wherein the polymer is obtained from a monomer composition comprising at least 80 wt % hydrophobic monoethylenically unsaturated monomer selected from a group a consisting of (meth) acrylate monomers, (meth)acrylonitrile monomers, styrene monomers, vinyl alkanoate monomers, monoethylenically unsaturated di- and tricarboxylic ester monomers and a mixture thereof, and at least 0.1% by weight and no more than 20% by weight hydrophilic monoethylenically unsaturated monomers selected from the group consisting of monoethylenically unsaturated carboxylic acids, monoethyenically unsaturated carboxylic anhydrides, monoethylenically unsaturated amides, hydroxyalkyl esters of monoethylenically unsaturated carboxylic acids, glycerol (meth) acrylate and a mixture thereof, based on the total weight of the monomers to make the polymer, and the polymer has a calculated Fox Tg in the range of −50° C. to +30° C.

8. The process according to claim 7, wherein the azo initiators have a solubility of less than 1 g per 100 g of DI water at 20° C. under 1 atm.

9. The process according to claim 7, wherein the azo initiators have at least one nitrile group.

10. The process according to claim 7, wherein the azo initiators are added to a reaction vessel directly, or mixed with monomers.

11. A paint comprising the polymer according to claim 1.

* * * * *